(12) United States Patent
Marin-Martinod et al.

(10) Patent No.: US 6,441,576 B1
(45) Date of Patent: Aug. 27, 2002

(54) DEVICE FOR ACTUATING A SEAT ELEMENT

(75) Inventors: Thierry Marin-Martinod, Nesles-la-Vallee; Laurent Nivet, Asnieres, both of (FR)

(73) Assignee: Labinal, Montigny le Bretonneux (FR)

( * ) Notice: Subject to any disclaimer, the term of this patent is extended or adjusted under 35 U.S.C. 154(b) by 0 days.

(21) Appl. No.: 09/722,501

(22) Filed: Nov. 28, 2000

(30) Foreign Application Priority Data

Nov. 29, 1999 (FR) .............................................. 9915015

(51) Int. Cl.⁷ .................................................. B25J 9/16
(52) U.S. Cl. ...................... 318/568.1; 318/652; 297/65; 297/327
(58) Field of Search .............................. 318/567, 568.1, 318/652; 297/65, 68, 69, 188.04, 327

(56) References Cited

U.S. PATENT DOCUMENTS

| 3,983,640 A | * | 10/1976 | Cardullo et al. ............. 35/12 E |
| 4,264,849 A | * | 4/1981 | Fleischer et al. ............ 318/568 |
| 4,375,900 A | * | 3/1983 | Tachibana et al. ........... 297/330 |
| 4,460,217 A | * | 7/1984 | Tsuda et al. ................. 297/361 |
| 4,467,252 A | * | 8/1984 | Takeda et al. ............... 318/603 |
| 4,689,537 A | | 8/1987 | Mizuta et al. |
| 4,698,571 A | | 10/1987 | Mizuta et al. |
| 4,729,601 A | | 3/1988 | Walle et al. |
| 5,214,360 A | * | 5/1993 | Gonser et al. ............... 318/551 |
| 5,748,473 A | * | 5/1998 | Breed et al. ........... 364/424.055 |
| 5,857,745 A | * | 1/1999 | Matsumiya ............. 297/354.13 |
| 5,887,949 A | * | 3/1999 | Kodaverdian .......... 297/423.36 |
| 5,930,152 A | * | 7/1999 | Dumont et al. ......... 364/528.37 |
| 5,992,798 A | * | 11/1999 | Ferry ...................... 244/118.6 |
| 6,059,364 A | | 5/2000 | Dryburgh et al. |

FOREIGN PATENT DOCUMENTS

| EP | 0 869 061 A2 | 10/1998 |
| WO | WO 99/50089 | 10/1999 |

* cited by examiner

Primary Examiner—Robert E. Nappi
Assistant Examiner—Rina I. Duda
(74) Attorney, Agent, or Firm—Larson & Taylor PLC

(57) ABSTRACT

A device for actuating a seat element includes an actuator fitted with a transducer delivering a state information representative of the current position of the actuator and a unit for controlling the actuator which includes a device for registering and for storing several reference state informations each representative of a position of the actuator for an identified position of the element and a device for driving the actuator so as to move the seat element towards several target positions. The control unit is adapted so as, when a movement towards a predetermined target position is commanded, to activate the actuator until the current reference state information delivered by the transducer is equal to the reference state information stored for the position of the commanded element.

7 Claims, 3 Drawing Sheets

DEVICE FOR ACTUATING A SEAT ELEMENT

The present invention relates to a device for actuating a seat element, of the type comprising:
- an actuator fitted with a transducer adapted so as to deliver a state information representative of the current position of the actuator,
- a unit for controlling said actuator, linked to the said transducer so as to receive the said state information representative of the position of the actuator, the control unit comprising:
  - means for registering a reference state information representative of the position of the actuator for an identified reference position of the element,
  - means for storing said reference state information; and
  - means for driving the actuator so as to move the seat element towards at least one predetermined target position of the seat element other than the reference position.

In order to improve the comfort of the user, numerous seats are nowadays fitted with electric actuation devices making it possible to alter the configuration of the seat by moving movable elements thereof. In particular, such seats are in particular used in transport vehicles such as aircraft, boats and railway cars.

It is common for each seat to comprise a tiltable back articulated to one end of a seat bottom, as well as a legrest, articulated to the other end of the seat bottom. The back and the legrest can both be moved between a substantially vertical position and a substantially horizontal position, thus allowing the seat to take several configurations. For example, among these configurations are provided a user reclining configuration in which the back and the legrest are both substantially horizontal and a sitting configuration in which the legrest and the back are both substantially vertical.

An actuation device is provided for each element of the movable seat.

Moreover, numerous seats are equipped with devices making it possible through a single command to move both the legrest and the footrest and to do so, in order to bring the seat, through a single command, into a predetermined configuration.

For each of these predetermined configurations of the seat, a predetermined position is fixed for each seat element.

In order at each instant to ascertain the position of the various seat elements, and thus be able easily to manage their movement, it is known practice to provide in the devices for actuating the seat elements a transducer such as a potentiometer making it possible to gather state information representative of the position of each actuator.

In order to ensure satisfactory movement of each seat element and correct tracking of its position, it is known practice to store a reference state information representative of the position of the actuator for a reference position of a relevant seat element. All the movements of the seat element are referenced with respect to this reference position specific to the seat element.

Thus, for each of the seat's predetermined configurations accessible through a single actuation device, the travel of the actuator required in order for the seat element to reach the desired target position from its reference position is determined.

From the desired travel of the actuator, an increment value is deduced for the state information registered by the transducer corresponding to this travel. Thus, to bring an element of the seat to a predetermined position, the actuator is activated until the current state information delivered by the transducer is equal to the reference state information incremented by an increment value corresponding to the anticipated travel of the actuator.

This solution operates in a satisfactory manner. However, when several seats are disposed side by side, as for example in a row of aircraft seats, it is found that, when all the seats are brought into one and the same predetermined configuration, the positions of each of the seat elements are not strictly identical.

Specifically, owing to the manufacturing tolerances of the mechanical structure of the seats and to the inaccuracies in the transducers used, even though, initially, the relevant seat elements are correctly aligned, after moving them along a travel corresponding to one and the same increment value in respect of the state information emanating from the transducer, the actual positions of the seat elements are not strictly identical, this being manifested as slightly different configurations of the seats, even though the commands given to each of the seats are identical.

Thus, the visual appearance of the assembly of seats is spoilt. Moreover, since the users who control their seat in a similar manner do not obtain strictly the same position for each of the elements of the seats, some of them may experience frustration.

The aim of the invention is to propose a device for actuating a seat element, making it possible to ensure that the position reached by the seat element is actually the anticipated position, and in particular that, when several seats equipped with this device are installed side by side, they react in a similar manner when they are operated so as to reach an identical predetermined configuration.

To this end, the subject of the invention is a device for actuating a seat element of the aforesaid type, characterized in that the said control unit comprises:
- means for registering at least one additional reference state information, each representative of the position of the actuator for a predetermined target position of the seat element;
- means for storing the or each additional reference state information; and said control unit is adapted so as, when a movement of the seat element towards a predetermined target position or towards the reference position is commanded, to activate the actuator until the current reference state information delivered by said transducer is equal to said reference state information stored for said seat element position designated by the command.

According to particular embodiments, the device comprises one or more of the following characteristics:
- said transducer is a potentiometer; and
- said reference state information and said additional reference state information are three in number.

The invention also concerns a seat comprising at least one movable element and at least one actuation device such as defined hereinabove mechanically associated with a seat element for its movement.

According to particular embodiments, the seat comprises one or more of the following characteristics:
- it comprises at least two movable elements, each mechanically associated with an actuation device as defined hereinabove, and it comprises a device adapted so as, under the action of a single command delivered by the user, to bring the seat into at least one predetermined configuration, and said predetermined target positions or said reference position of the seat elements are the positions of the seat elements in the or each predetermined configuration of the seat; and the said predetermined configurations of the seat comprise a mealtime configuration, a landing configuration, and a reclining configuration.

Finally, the invention concerns an assembly of seats, comprising at least two seats of similar structure, as are defined hereinabove.

According to a particular embodiment, the predetermined target positions and the reference positions of the corresponding seat elements are identical.

The invention will be better understood on reading the description which follows, given merely by way of example and with reference to the drawings in which:

FIGS. 3, 4 and 5 are diagrammatic views of the seat of FIG. 1, represented in three distinct predetermined configurations;

Figure 1:
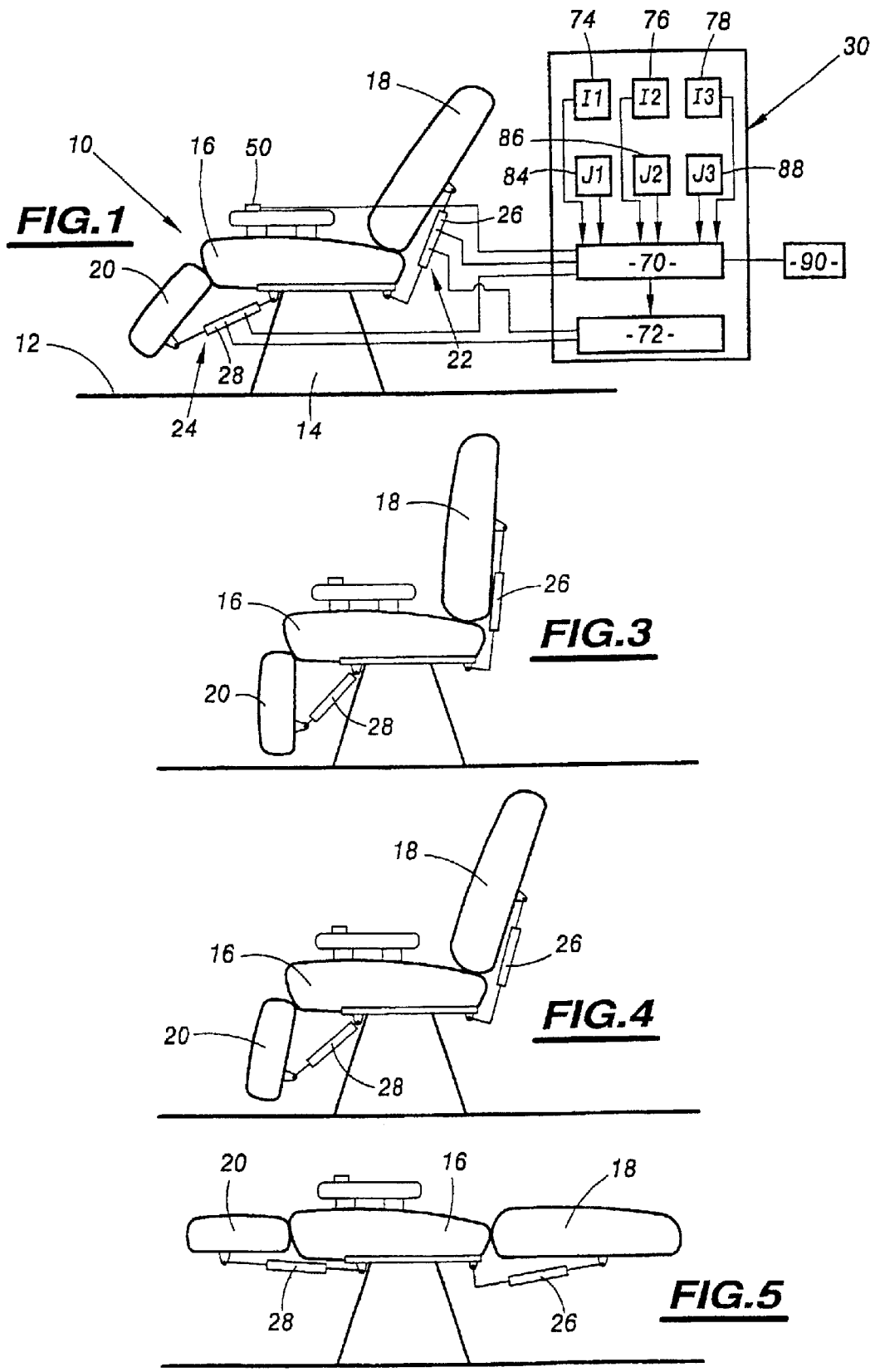
FIG. 1 is a diagrammatic side view of a seat equipped with two actuation devices according to the invention.

The seat 10 represented in FIG. 1 is a passenger seat of an aircraft. This seat is fixed to the floor 12 of the aircraft.

The seat 10 comprises a pedestal 14 secured to the floor 12 on which rests a substantially horizontal seat bottom 16. A back 18 which can move between a substantially vertical position and a substantially horizontal position in which it extends the seat bottom 16 is articulated to one end of the seat bottom.

A legrest 20 which can move between a substantially vertical position folded down beneath the seat bottom 16 and a substantially horizontal outstretched position extending in line with the seat bottom 16 is articulated to the other end of the seat bottom 16.

A first actuation device 22 is mounted between the seat bottom 16 and the back 18 so as to ensure movement of the latter between its vertical position and its horizontal position.

Likewise, a second actuation device 24 is mounted between the seat bottom 16 and the legrest 20 so as to ensure movement of the latter between its folded down position and its outstretched position.

Each actuation device 22, 24 comprises a specific actuator, denoted 26, 28, respectively. The actuators are supplied with electric current from a common control unit 30 constituting a part of the actuation devices of each element of the seat. This control unit 30 is linked separately to each of the actuators 26, 28 so as to ensure their independent driving.

Figure 2:
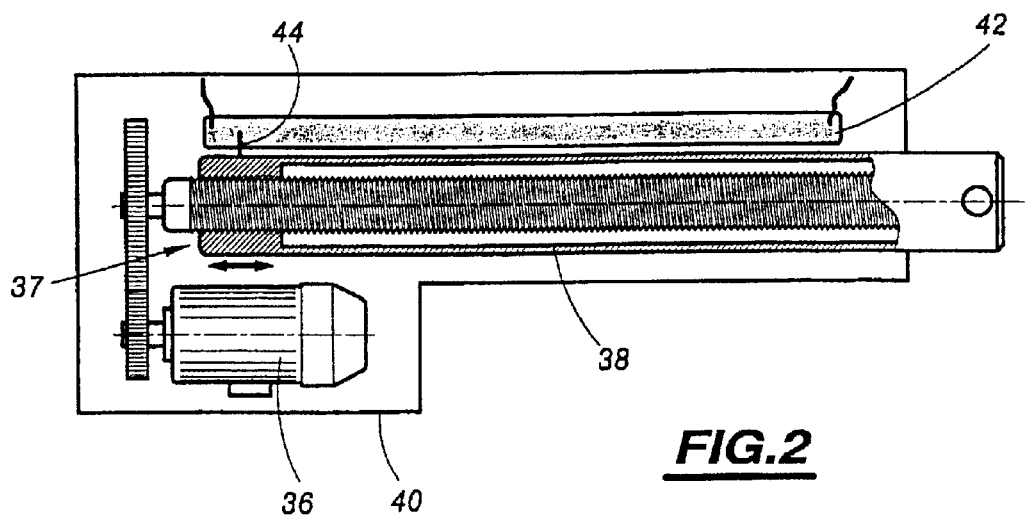
FIG. 2 is a diagrammatic view of an actuator of an actuation device according to the invention.

The actuators 26 and 28 have substantially the same structure. One of them is illustrated diagrammatically in FIG. 2.

Thus, an actuator comprises a reduction motor gear 36 associated, as known per se, for example with the aid of a screw/nut arrangement 37, with a rod 38 translationally movable with respect to a casing 40 in which the reduction motor gear is fixed.

Furthermore, a potentiometer 42 or any other type of suitable transducer is fixed to the casing 40. A slider 44 of the potentiometer is secured to one end of the rod 38 of the actuator. The potentiometer 42 is linked to the control unit 30. Thus, the potentiometer 42 allows the control unit 30 to continuously gather a state information representative of the current position of the actuator. This information is the resistance of the potentiometer in the case considered.

A keypad 50 (FIG. 1) is secured to the seat so as to allow the user to reach through a single command acting on several actuators one of three predetermined configurations of the seat. The number of distinct configurations may be different from three, for example equal to two or greater than four. To this end, the keypad comprises, in the example considered, three buttons each associated with a predetermined configuration. These configurations, which are illustrated in FIGS. 3 to 5 respectively, are a mealtime configuration, a landing configuration and a reclining configuration.

Another predetermined position can be defined directly by the user and is accessible through a specific button.

In the mealtime configuration, illustrated in FIG. 3, the legrest 20 and the back 18 are both in predetermined positions in which they are strictly vertical and define an angle of 90° with the plane of the seat bottom.

In the landing configuration, illustrated in FIG. 4, the back 18 and the legrest 20 are in predetermined positions such that the back 18 defines an angle of around 20° with the plane of the seat bottom whilst the legrest 20 defines an angle of around 10° with the vertical.

In the reclining configuration, illustrated in FIG. 5, the back 18 and the legrest 20 are in predetermined positions in which they extend the seat bottom 16 and thus lie substantially in the plane of the latter.

In order to ensure control of the seat, the control unit 30 comprises a central information processing unit 70 to which the keypad 50 is linked. Moreover, the potentiometers of the two actuators 26 and 28 are also linked to this central information processing unit 70 so that the value of the state information specific to each actuator is delivered continuously to this unit.

This central information processing unit is linked to a unit 72 for supplying the actuators 26 and 28. The unit 72 is adapted for supplying the actuators 26 and 28 with electric current as a function of control commands received from the central information processing unit 70. In particular, the electric current delivered by the supply unit 72 is adapted so as to ensure a satisfactory speed of the actuators as well as a current having a shape allowing the movement of the actuator in the desired direction.

For each of the target positions which the seat elements are required to take when altering the seat towards a predetermined configuration, the control means 30 comprise means for storing a state information representative of the exact position of the actuator when the associated seat element is in the anticipated target position.

Thus, for each seat element, several reference state information are stored. Each reference state information corresponds to a target position for a seat element, this target position being defined for a predetermined configuration of the seat.

More precisely, and as illustrated in FIG. 1, the control unit 30 comprises a memory 74 for storing a reference state information denoted $I_1$ corresponding to the value of the state information delivered by the potentiometer of the actuator 26 when the back 18 is in its target position occupied when the seat is in its mealtime configuration.

Likewise, the control unit 30 comprises two other memories 76, 78, in which are stored reference state information denoted $I_2$ and $I_3$ corresponding, respectively, to the state information delivered by the potentiometer of the actuator 26 when the seat is in an exact landing and reclining configuration.

Similarly, the control unit 30 comprises, in respect of the legrest 20, three memories denoted 84, 86, 88, in which are stored three reference state informations denoted $J_1$, $J_2$, $J_3$ corresponding to the values of the state information registered by the potentiometer of the actuator 28 respectively when the seat is exactly in its rest, takeoff and reclining configuration.

The memories 74 to 88 are linked to the central information processing unit 70. These memories are rewritable under the control of a central unit 70. In particular, the central information processing unit is adapted so as, upon receipt of a suitable control command emanating for example from an ancillary keypad 90, to store, in each of the memories, the current state information measured by one or other of the potentiometers of the actuators 26 and 28.

Figure 6:
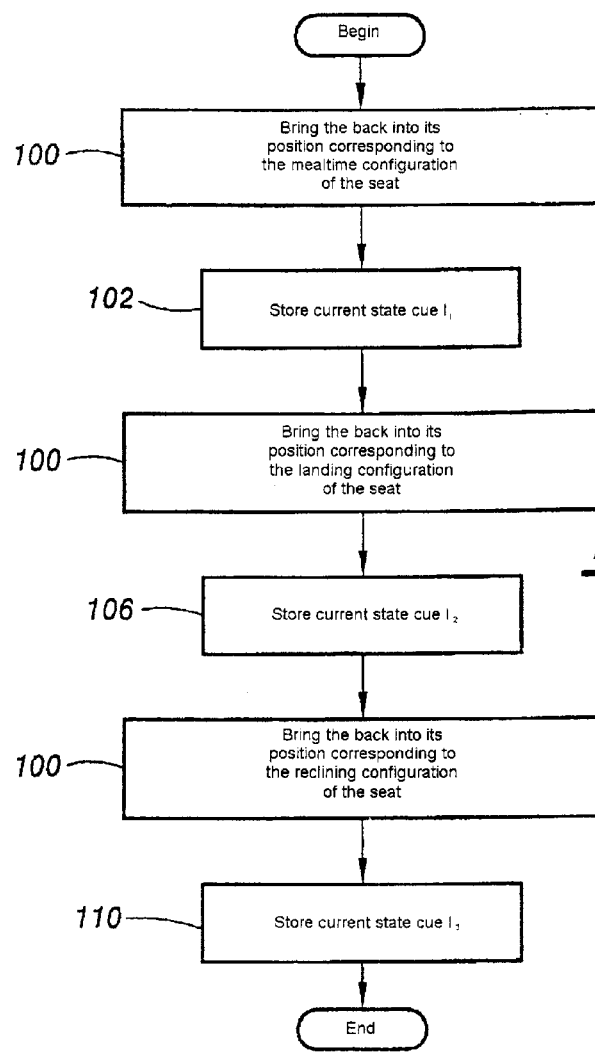
FIG. 6 is a flowchart illustrating the procedure for calibrating an actuation device according to the invention.

In order to store these reference state information, the multiple calibration algorithm described in FIG. 6 is implemented. This algorithm is described in respect of the storing of the reference state information for the back. However, a similar algorithm is implemented in respect of the legrest. This algorithm may only be implemented by authorized persons and not by the passenger himself.

In step 100, the back is firstly brought manually into its target position corresponding to the seat's mealtime configuration illustrated in FIG. 3.

In step 102, by depressing a predetermined key of the ancillary keypad 90, the value delivered by the potentiometer of the actuator 22 is stored in the memory 74 and then constitutes the reference state information for the back corresponding to the mealtime configuration of the seat.

The back 18 is thereafter brought manually, in step 104, into its target position corresponding to the takeoff configuration of the seat. By depressing a predetermined key of the ancillary keypad 90, the value of the state information delivered by the potentiometer is stored in the memory 76.

Finally, in steps 108 and 110, the back is brought into its target position corresponding to the reclining configuration of the seat and the value indicated by the potentiometer for this position of the back is stored in the memory 78.

A similar multiple calibration algorithm is implemented in respect of the legrest 20 so as to enter values into the memories 84 to 88.

The storing of the reference state informations for the back and for the legrest in respect of a given configuration of the seat can be stored simultaneously by pressing a single button.

As a variant, the reference state information are stored separately for each element of the seat and for each specified configuration. In this variant, the calibration of a seat element which has been replaced is easy, since only the replaced seat element need be brought into the target position corresponding to the given configuration of the seat so as to store the associated reference state information.

Furthermore, according to a particular embodiment, the actuation device comprises means for saving a seat configuration preferred by the user and control means allowing the seat to retake this preferred configuration automatically. The saving means comprise a save button which can be actuated by the user and means for registering and storing the reference state information of each actuator upon depressing the save button. Upon selection of the preferred position by the user, the actuators are activated until the information representative of the current position delivered by each transducer is equal to the corresponding reference state information.

When several similar seats are disposed side by side, the algorithm illustrated in FIG. 6 is implemented separately for each seat element. Thus, the values $I_1$, $I_2$, $I_3$, $J_1$, $J_2$, $J_3$ stored in the memories of each seat correspond to actuator positions for which the corresponding seat elements are perfectly aligned. These values are a priori different from one seat to another owing to the manufacturing tolerances of the seats and to the non-linearities of the potentiometers.

This initial phase of calibration is implemented only when mounting the seats. The values stored in the memories 74 to 88 are thereafter preserved for the entire lifetime of the seat. However, these values may be altered, if necessary, so as to define new predetermined configurations for each seat or during maintenance operations following replacement of one of the elements.

Thus, the values held in memory corresponding to the predetermined configurations cannot be altered by the user of the seat. Only the values corresponding to the or each preferred configuration of the seat can be altered. The values corresponding to the predetermined configurations can only be altered by the maintenance operators by using removable means or coded-access or locked-access means allowing the registering of the additional reference state information and their storage.

Figure 7:
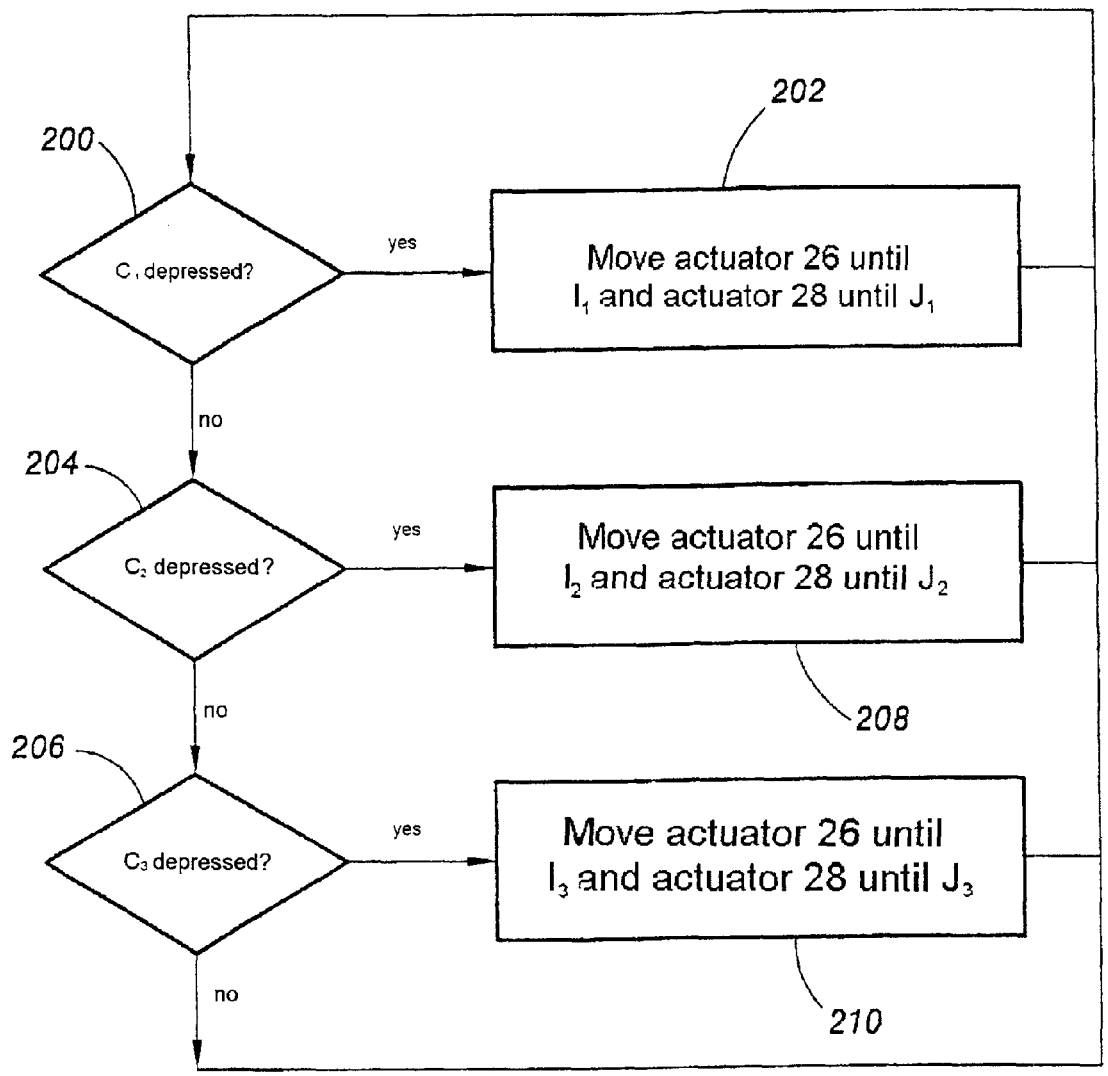
FIG. 7 is a flowchart setting out the manner of operation of an actuation device according to the invention.

After this initial phase of calibration, the control unit 30 is adapted so as to implement the algorithm illustrated in FIG. 7.

In particular, tests are performed continuously to investigate the depressing of a key of the keypad 50 corresponding to a predetermined configuration.

Upon detection, in step 200, of the depressing of a predetermined control key C1, corresponding to the placing of the seat in the mealtime configuration, the actuator 26 of the back is operated, in step 202, until the state information delivered by the potentiometer is equal to the value $I_1$ stored in the memory 74. Simultaneously, the actuator 28 is operated until the associated information is equal to $J_1$.

If one of the tests performed in steps 204 and 206 corresponding respectively to the landing and reclining configurations of the seat holds true, the actuator 26 is activated, in steps 208 or 210, until the state information delivered by the potentiometer is equal to the value $I_2$ or $I_3$ held in the memory 76 or 78 respectively. Simultaneously, the actuator 28 is operated until the associated information is equal to $J_2$ or $J_3$.

It is appreciated that with the implementation of such algorithms, when controlling the alteration of the configuration of a seat towards a predetermined configuration, each of the actuators brings the seat element which it controls into a position such that the state information delivered by the associated potentiometer is equal to that stored during the calibration phase. Thus, all the adjacent seats being calibrated, while the positions of the seat elements are strictly identical, upon identical commands of the seats, all the seats are in strictly identical configurations, regardless of the manufacturing tolerances of the seats and any measurement disparities of the potentiometers.

What is claimed is:

1. An assembly of seats comprising:
    at least two similar seats disposed side by side, each said seat comprising at least one movable element; and
    at least one actuation device mechanically associated with the at least one movable element of each said seat, each said actuation device including
    an actuator fitted with a transducer adapted so as to deliver a state information representative of a current position of the actuator as the actuator moves, and
    a control unit for controlling said actuator, said control unit being linked to said transducer so as to receive the state information representative of the current position of the actuator, the control unit including means for registering (a) a first reference state information delivered by the transducer of the actuator and representative of a position of the actuator for an identified reference position of the movable element, and (b) at least one additional reference state information representative of a position of the actuator for at least one predetermined target position of the movable element, the at least one additional reference state information being delivered by the transducer of the actuator, means for storing said first reference state information and the at least one additional reference state information, and means for driving the actuator so as to move the movable element towards the at least one predetermined target position of the movable element, whereby said control unit is adapted so as, when a movement of the movable element towards the at least one predetermined target position or the identified reference position is commanded, to activate the actuator until the current reference state information delivered by said transducer is equal to the selected one of said first or the at least one additional reference state information stored for the associated said movable element position selected.

2. An assembly of seats according to claim 1, wherein said transducer is a potentiometer.

3. An assembly of seats according to claim 1, wherein said first reference state information and said at least one additional reference state information are three in number.

4. An assembly of seats according to claim 1, wherein each seat comprises at least two movable elements, each mechanically associated with an actuation device and in that each seat comprises a device adapted so as, under the action of a single command delivered by the user, to bring the seat into at least one predetermined configuration, and in that said predetermined target positions or said reference positions of the movable elements are the positions of the movable elements in the or each predetermined configuration of the seat.

5. An assembly of seats according to claim 4, wherein said predetermined configurations of the seat comprise a mealtime configuration, a landing configuration, and a reclining configuration.

6. An assembly of seats according to claim 4, wherein the predetermined target positions and the reference positions of the corresponding movable elements are identical for all the seats of said assembly of seats.

7. An assembly of seats according to claim 1, further comprising means allowing the alteration of the at least one or each additional reference state information corresponding to predetermined configurations of the seat only by authorized persons other than the user of the seat.

* * * * *